United States Patent [19]
Ghaderi

[11] Patent Number: 5,438,633
[45] Date of Patent: Aug. 1, 1995

[54] METHOD AND APPARATUS FOR GRAY-LEVEL QUANTIZATION

[75] Inventor: Mohsen Ghaderi, Rochester, N.Y.

[73] Assignee: Eastman Kodak Company, Rochester, N.Y.

[21] Appl. No.: 28,449

[22] Filed: Mar. 9, 1993

Related U.S. Application Data

[63] Continuation-in-part of Ser. No. 841,668, Feb. 26, 1992, abandoned, which is a continuation-in-part of Ser. No. 757,107, Sep. 10, 1991, abandoned.

[51] Int. Cl.[6] .............................................. G26K 9/38
[52] U.S. Cl. ................................... 382/270; 358/430; 358/466; 382/261
[58] Field of Search .......................... 382/6, 50, 53, 54; 358/430, 456, 465, 466; 348/404

[56] References Cited

U.S. PATENT DOCUMENTS

| | | | |
|---|---|---|---|
| 4,302,672 | 11/1981 | Kato et al. | 382/6 |
| 4,438,495 | 3/1984 | Collins et al. | 382/6 |
| 4,644,419 | 2/1987 | Schlichtig | 382/53 |
| 4,701,807 | 10/1987 | Ogino | 382/50 |
| 4,788,976 | 11/1988 | Takao et al. | 382/53 |
| 4,903,316 | 2/1990 | Hongo et al. | 382/50 |
| 5,170,443 | 12/1992 | Todd | 382/50 |

Primary Examiner—Joseph Mancuso
Attorney, Agent, or Firm—Raymond L. Owens

[57] ABSTRACT

An adaptive quantizer for digital image processing eliminates the influence of non-information anomalies, such as scratches, dust, etc. that may be present in an image in the course of determining the minimum and maximum signal levels LCHAR and HCHAR, respectively, and more accurately updates respective estimated image information level PREV_HCHAR that effectively prevents discontinuities or 'jumps' during line-by-line adjustment, thereby effectively obviating the problem of potential corruption of a local mean window and taking into account how 'noisy' the background is.

14 Claims, 6 Drawing Sheets

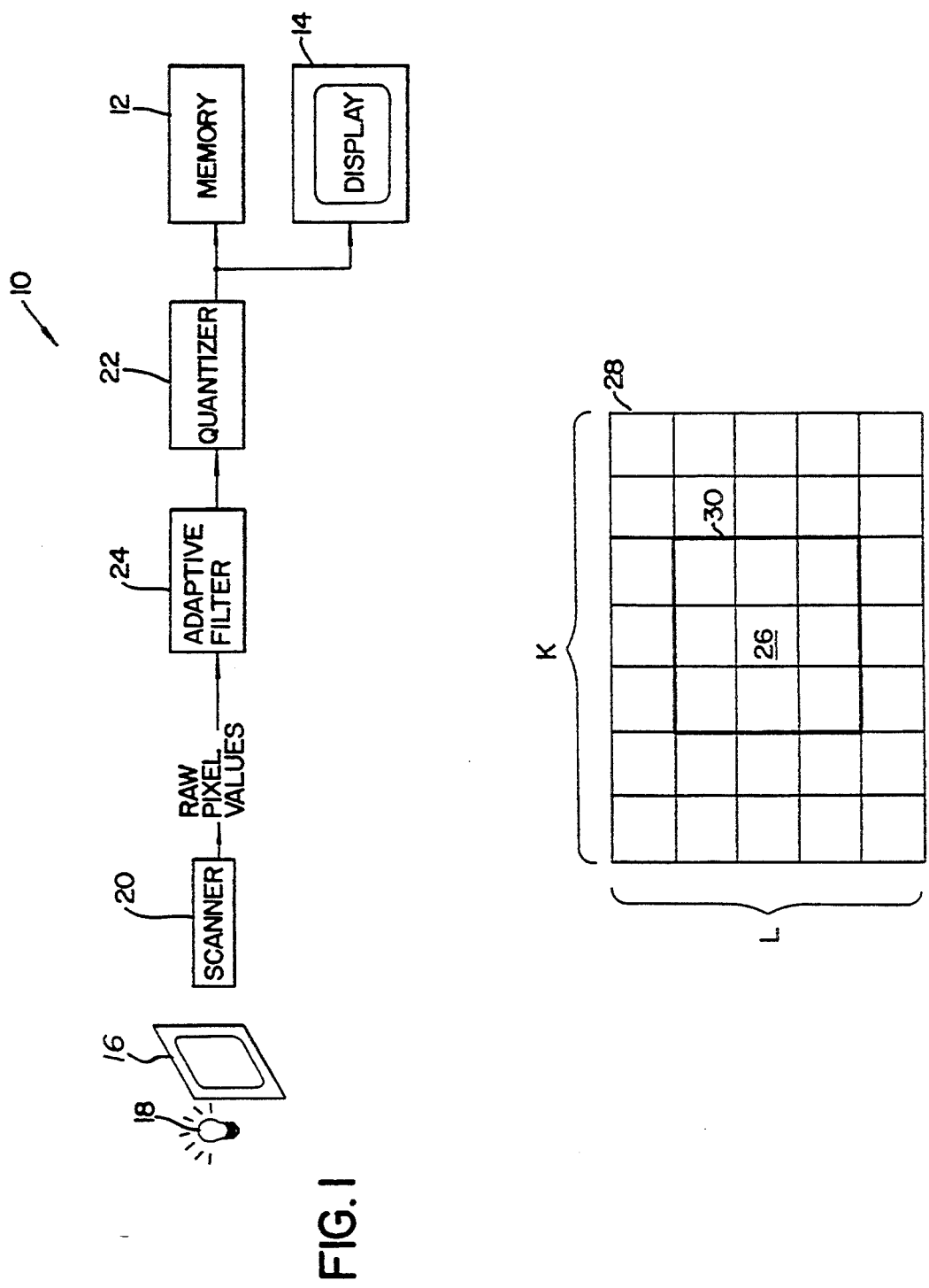

METHOD AND APPARATUS FOR GRAY-LEVEL QUANTIZATION

CROSS-REFERENCE TO RELATED APPLICATIONS

The present application is a continuation-in-part of U.S. patent application Ser. No. 841,688, filed Feb. 26, 1992 which is a continuation-in-part of U.S. patent application Ser. No. 757,107, filed Sep. 10, 1991, (both now abandoned) entitled "Method and Apparatus for Gray-Level Quantization," by Mohsen Ghaderi, assigned to the assignee of the present application and the disclosure of which is herein incorporated.

FIELD OF THE INVENTION

The present invention relates in general to digital image processing and is particularly directed to an enhancement of the gray-level quantization mechanism described in my above-referenced co-pending '107 application, specifically to a mechanism for eliminating the influence of non-information anomalies such as scratches, dust, solid border regions, etc., in the course of determining minimum and maximum signal levels, and for more accurately updating an estimated image information level PREV_HCHAR so as to effectively prevent discontinuities or 'jumps' during 'on-the-fly' line-by-line adjustment, thereby effectively obviating the problem of potential corruption of a local mean window by a non-information image anomaly and taking into account how 'noisy' the background is.

BACKGROUND OF THE INVENTION

As described in my above-referenced U.S. patent application Ser. No. 757,107, filed Sep. 10, 1991, entitled "Method and Apparatus for Gray-Level Quantization," image-scanning devices, such as photo-copiers, generate digital signals representative of picture elements, or pixels, that make up the source image, such as a text-containing document, typically comprised of letters, numbers, and line-drawing graphics in which the original information has a black or white level background, with no information intended to be conveyed by any shade of gray.

However, the imaging process typically deals with shades of gray, partially due to the fact that lighting environments of different images vary, and because repeated copying may make different parts of the black regions, for example, lighter than other parts of the image. Moreover, the use of gray levels reduces the visibility of "jaggies" that result from the spatially discrete nature of the scanning process. Since an intolerable loss in legibility may result if the images are simply recorded as black or white values, i.e., if the intensity levels are recorded at a digital resolution of only one bit per pixel, it is necessary in most cases to record the images in a gray-scale (multi-bit) representation.

Because gray-level encoding increases data resolution and thereby mandates a larger memory requirement and reduces processing speed, it is still desirable to reduce the number of bits per pixel, so long as an acceptable degree of text legibility can be achieved. To this end, the Weideman, U.S. Pat. No. 4,853,969, describes an adaptive quantization technique, in which a high-intensity-resolution representation of an initial data capture is reduced, in order to limit the cost or increase the speed of the apparatus. The patented Weideman arrangement reduces the number of bits per pixel, while retaining a reasonable degree of data effective resolution by adapting the values of a fixed number of quantization thresholds, and thus the sub-ranges that pairs of adjacent levels define, in accordance with the input values that the quantization process is to quantize. When an input value falls between adjacent quantization thresholds, the Weideman arrangement generally moves those thresholds closer together. The general effect is to cause quantization thresholds to "bunch up" in portions of the input range where values actually occur and to be sparsely spaced in other parts. The likelihood that different input values will be resolved in the fewer-bit-per-pixel output is therefore considerably greater than would be the case if the quantization thresholds were evenly spaced. At the same time, however, such an arrangement tends to detract from the contrast that is ordinarily desirable for text-type images and is often desirable for other types of images.

In accordance with the adaptive gray-level quantization scheme described in the above-identified '107 application, the required degree of data resolution is maintained in those portions of the input range in which it is most important to do so, while also producing high contrast that is desirable in a variety of image types. An image source, such as a textual document is scanned to generate raw pixel values representing a raw version of the source's image. The pixel values are processed and stored in an appropriate medium, or they are displayed. Processing of the image includes a quantization step in which a background range is derived for each pixel from the values of other pixels in a version of the image. Quantization levels are then established outside the background range, and the pixel value outputs associated with the quantization step are generated by quantizing the pixel values associated with the quantization step using the set of quantization levels thus established.

FIG. 1 diagrammatically illustrates depicts a digital image processing system 10 of the type described in the above-referenced '107 application for recording in a memory 12 or displaying on a display device 14 the contents of an image source such as a microfilm strip 16. Microfilm strip 16 may be illuminated by a light source 18 and the illuminated image scanned by a digitizing scanner 20. Scanner 20 includes circuitry that treats the resultant image as being divided into a plurality or array of pixels, and it generates digital image signals representing digitized values of those pixels as 'raw pixel-value' digital input signals for application to downstream digital image processing components, including an adaptive filter 24 and a quantizer 22, prior to storage or display.

The adaptive quantizing mechanism to which the invention described in the '107 application is directed is performed by a quantizer 22, which is typically coupled downstream of other image-processing elements, such as an adaptive filter 24. Quantizer 22, which quantizes the output of adaptive-filter 24 in accordance with parameters that it determines from the raw output of the scanner 20, receives filtered pixel values expressed in a relatively large number M of bits per pixel and converts the incoming pixel values to corresponding output pixel values expressed in a smaller number N of bits per pixel. In doing so, quantizer 22 establishes quantization thresholds and quantization sub-ranges. Each pair of successive quantization thresholds defines a quantization sub-range, and all pixels whose input values fall within a given sub-range are assigned the same output pixel value. That is, given an ordered sequence of quantization levels Ti, where Ti-1<Ti<Ti+1, a pixel's output value is i if its input pixel value falls between Ti−1 and Ti.

According to the invention described in the '107 application, the total quantizer input range is divided between a "background" range and a "signal" range separated by a boundary or threshold BCK_LEVEL determined in accordance with the incoming pixel values in a version of the image being processed. Quantization thresholds are then chosen to occupy the signal range—which in text-type images is typically the range occupied by characters—while remaining outside the background range, so that the background range occupies only one of the sub-ranges that the quantization thresholds define.

The manner in which the background range is determined is not critical, and the threshold BCK_LEVEL between the background and signal ranges may correspond to a level that is roughly the average of the pixel values in the image version upon which the background range is based, or at least the average of those values that occupy a predetermined part of the range permitted by the number system in which the pixel values are provided. The background level BCK_LEVEL is adaptively adjusted during the course of a single pass through the image, being increased or decreased in accordance with the values of local averages. In addition, both ends of the quantization-threshold range may be set adaptively; not only may one end of the range be set in accordance with the background level, but the other end may be set by other characteristics of image pixel values. Although the particular manner in which the levels are determined from signal-range data is not critical, I have found a variation-based method to be particularly beneficial.

The threshold sequence is determined in accordance with three image-dependent parameters BCK_LEVEL, IMG, and UPPER_THR. With these parameters determined, the lowest threshold is set equal to BCK_LEVEL; all input values below this level are considered to be background and are assigned an output value of zero. This lowest threshold BCK_LEVEL is established in such a manner as usually to have a value just slightly above the general background level in the particular image being quantized. Similarly, all input values above an upper signal range threshold value UPPER_THR are given the same, maximum signal value of $2^K-1$.

Intermediate quantization thresholds can be determined in any number of ways, such as that described in the above-referenced Weideman patent. Another technique is to divide the range between BCK_LEVEL and UPPER_THR into $2^K-2$ equal sub-ranges by equally spacing the remaining $2^K-3$ quantization thresholds. Another, preferred scheme is to divide the range between BCK_LEVEL and UPPER_THR into two parts, the lower part being the range between BCK_LEVEL and IMG and the upper part being the range between IMG and UPPER_THR. IMG is chosen so that it lies in the middle of the values of pixels which are located at "interesting" positions of the image, such as at the edges of characters. Half of the quantization thresholds are placed in each part, being spaced equally within each part, so that all sub-ranges in the lower part (between BCK_LEVEL and IMG) are of the same size, and all those in the upper part (between IMG and UPPER_THR) are of the same size, but all those in one part are not in general of the same size as those in the other part. A departure from this general approach occurs in those cases in which the number of output bits per pixel is the same as the number of input bits per pixel or is only one less.

It will be appreciated that the quantization operation does not necessarily require a reduction in the number of bits per pixel; imposition of quantization thresholds different from those implicitly employed in the input data might be used to generate output values different from the input values even though input and output values are expressed in the same number of bits per pixel. Thus, quantization does not necessarily mean reduction in the number of bits per pixel. The legibility benefits of this adaptive quantization technique can result even in applications in which there is no reduction in the number of bits per pixel. If the number of output bits per pixel is the same as the number of input bits per pixels or differs from it by a value of only one, it is preferable to divide the "signal" range above BCK_LEVEL into equal sub-ranges.

When the number of output bits per pixel is the same as the number of input bits per pixel, the pixel output value Po is computed from the pixel input value Pi in accordance with the following formula, which effectively employs quantization thresholds that are equally spaced throughout the signal range:

$$Po = trunc[(2^K-1)(Pi-BCK\_LEVEL)/(2^K-1-BCK\_LEVEL)] \quad (1)$$

where trunc(x) means truncation, i.e., taking the largest whole number that is less than x.

A similar calculation is employed when the number of bits per pixel in the output value Po is only one less than the number in the input, namely:

$$Po = trunc[(2^K-1)(Pi-BCK\_LEVEL)/((2)(2^K-1-BCK\_LEVEL))] \quad (2)$$

The only other departure from the general approach occurs in the degenerate case in which there is only one output bit per pixel. In that case, IMG is employed as the sole quantization threshold.

The pixel values for determining the parameters BCK_LEVEL, IMG and UPPER_THR could be drawn from the same version of the image as those compared with the quantization thresholds, e.g., from the image version that the adaptive filter produces. This is not necessary, however; as explained above, the parameters BCK_LEVEL, IMG, and UPPER_THR are obtained from the raw version produced by the scanner 20 rather than from the version produced by the adaptive filter 24. In determining these parameters, some intermediate values that are employed to update the values BCK_LEVEL, IMG and UPPER_THR are first calculated.

Referring now to FIG. 2, for each pixel 26, quantizer 22 establishes two windows, a larger window 28 and a smaller window 30. The larger window 28 is a neighborhood within which an average neighborhood level Ma and an "activity level" Md, i.e., a variation measure, are computed. The inner window 30 is one over which a low-pass filter is applied to filter out noise before certain tests to be described below are applied. The window sizes and shapes are merely exemplary; indeed, although the pixel 26 under consideration is shown as being centered in both windows, as it typically would be, such centering is not at all critical to the operation of the quantizer.

In the following description, the operations for updating the quantization-threshold-determining parameters are depicted in flow-chart form usually employed to depict programs for general-purpose processors, and have been implemented in a single program-controlled processor. In such an arrangement, of course, it is difficult to perform the updating on a real-time basis at the speeds at which images are typically scanned. However, the steps are such that those skilled in the art will recognize them as being readily implemented in dedicated hardware that will permit processing in real time. For this reason, the updating scenario has been implemented such that the gray-level quantization can be performed on a one-pass basis. Namely, although a several-scan-line delay is imposed in order to enable the system to obtain the data for a complete window for each pixel, there is no need to perform a first pass in which the data for the complete image are obtained to compute parameters and then return in a second pass to process data on the basis of those computed parameters.

In a real-time system, the quantizer begins producing output pixel values once the window lag has occurred. At each pixel time, the quantizer compares the input pixel value Pi with established threshold values and generates an output pixel value Po. It also computes or adjusts several intermediate values, which are used once every other scan line to update the values BCK_LEVEL, IMG and UPPER_THR, so as to establish new threshold values for use on the next two scan lines.

FIG. 3A depicts a portion of the quantization image processing routine that is performed at each pixel time. The general purpose of this portion part of the routine is to adjust three intermediate values BCK_THR, HCHAR, and LCHAR, which are used at the end of every two scan lines to provide new values to the thresholds: BCK_LEVEL, IMG, and UPPER_THR. At the beginning of an image, the routine of FIG. 3A initializes BCK_THR, HCHAR, and LCHAR to values of 0, 128, and 200, respectively, and it establishes thresholds in accordance with BCK_LEVEL, IMG, and UPPER_THR values of 0, 180, and 220, respectively. That is, the quantization levels employed for the first scan line do not depend on input pixel values. Ordinarily, since the appearance of the first few scan lines is not important, the first-line quantization levels are chosen arbitrarily, corresponding to step 32 of the routine of FIG. 3A.

After initialization step 32, the routine of FIG. 3A departs from the usual flow-chart convention and depicts two parts of the process occurring in parallel. One part, which begins with a query or decision step 34, is employed to develop intermediate value BCK_THR, from which the background- and signal-range-determining parameter BCK_LEVEL is obtained. A determination of BCK_THR is based on the mean Ma of the raw-version pixel values in larger window 28. As a result of this part of the routine, BCK_THR tends toward the average of these local mean values. The local mean value Ma affects BCK_THR only if it is less than a predetermined value in the darker part of the input range.

Specifically, the illustrated processing scheme is intended for eight-bit input values, which range from 0 through 255, and the BCK_THR computation is based only on pixels in regions light enough that their Ma values are less than 205. This is the purpose of query step 34, which causes the BCK_THR-adjusting steps to be bypassed if Ma is not less than 205. If the mean value Ma is less than 205, on the other hand, the routine proceeds to query step 36, which determines whether the input pixel Pi under consideration is the first pixel in a scan line. If the answer to query step 36 is YES, BCK_THR is simply set equal to Ma in step 38. Otherwise, BCK_THR is compared with Ma in query step 40. BCK_THR is then adjusted up or down toward the Ma value in one of steps 42 and 44, respectively. The adjustment increment 1/K employed in steps 42 and 44 is the reciprocal of the width of the larger window 28; that is, K pixel times are required to change BCK_THR by one unit out of the 256-unit range of possible input values.

The other portion of the routine of FIG. 3A, which begins with decision step 46, is employed to adjust the two intermediate values HCHAR and LCHAR on which the IMG value is based. The remaining quantization-level-determining parameter, UPPER_THR, is based on both BCK_LEVEL and IMG. HCHAR and LCHAR are the highest and lowest raw-version pixel values, respectively, that have been encountered in the current scan line, fall within the signal range, and meet certain criteria that identify them as being in "interesting" parts of the image. A determination of whether a pixel is located in an "interesting" portion of the image is carried out in step 46, which applies two tests. The first test of step 48 determines whether the mean Mb for the smaller window 30 exceeds the larger-window mean Ma. The second test of step 46 determines whether the variation within the larger window exceeds a general background variation level.

More particularly, an "activity" level Md is computed as a measure of the variation of the raw pixel values within the larger window 28. While the activity level Md need not be computed over the same window as the neighborhood average Ma, it has been found convenient to use the same window for both. Any variation measure can be used for this purpose, the common one being standard deviation. Because of computation-time considerations, however, average absolute mean deviation is preferred. In the illustrated embodiment, Ma is calculated as:

$$M_d = \frac{1}{KL} \sum_{i=y}^{Y+L-1} \sum_{j=x}^{x+K-1} |P_{ij} - M_w|, \quad (3)$$

where Pij is the raw-version value of the jth pixel in the ith row, K is the larger-window width, and L is the larger-window height, Mw is the average level in the window over which the activity level is computed (here equal to Ma), and the upper-left-corner pixel in that window is the xth pixel is the yth row. This activity value is compared with a general background activity level MD_THR, which is computed in such a way as to tend toward an activity-level value that would result from computing the variation over the entire raw version of the image. While a value strictly equal to one computed over the entire image cannot be obtained in a one-pass arrangement, a good substitute can be obtained by using an approach depicted in FIG. 4 for determining MD_THR. If the adaptive filter 24 is of the type described in my copending U.S. patent application Ser. No. 757,091, entitled "Method and Apparatus for Spatially Variant Filtering," filed on Sep. 10, 1991, assigned to the assignee of the present application and the disclosure of which is herein incorporated, then such an MD_THR value will be available from the adaptive filter 24.

The overall approach in the FIG. 4 routine is to keep a single value of the activity threshold MD_THR throughout an entire scan line, and to update it at the end of each scan line in accordance with an intermediate variation-indicating value IMG_MD. The routine varies IMG MD during the line scan so that it tends toward the average of the variations in the windows of those pixels whose pixel variations exceed a level PREV_MD that the routine has identified as being the average variation in certain low-spatial-frequency regions of the image.

At the beginning of each image, step 47 of the FIG. 4 routine initializes the activity threshold MD_THR, as well as three variables IMG_MD, PREV_MD, and BG_MD used in the routine. Again, an eight-bit resolution yields a pixel-value range of 0–255. A non-limitative initialization value of eight may be employed for all three of these variables. Like the routine of FIG. 3, the activity threshold determining routine of FIG. 4 departs from the usual flow-chart convention by depicting two parts of the routine as operating in parallel. A first portion begins with decision step 48, while the other portion, which is employed to establish the average activity level (i.e., variation) PREV_MD in low-frequency regions, begins with another decision step 50.

Like MD_THR, PREV_MD is updated only at the end of each scan line. In the interim, a temporary value BG_MD, from which PREV_MD is updated, is adjusted by that portion of the routine of FIG. 4 which starts with decision step 50. This decision step serves to identify pixels that are most likely to be in low-spatial-frequency regions.

For this purpose, step 50 employs as a criterion the equality of Ma and Mb, i.e., of the larger- and smaller-window averages. If the input pixel Pi under consideration meets this criterion, then BG_MD is adjusted up or down slightly toward the activity level Md within that particular pixel's larger window. Specifically, if decision step 50 determines that BG_MD exceeds Md, then BG_MD is decreased by 1/100 in a step 54; that is, step 54 must be reached one hundred times to change BG_MD by one unit at the pixel-value resolution. If BG_MD does not exceed Md, BG_MD is increased by 1/100 in a step represented by block 56. Such an adjustment of BG_MD occurs for every pixel that meets the criterion of step 50.

At the end of every scan line, the average low-frequency-region activity-level value PREV_MD is updated to equal BG_MD, as shown in step 58. This PREV_MD value is used in the first step 48 of the other parallel routine. Specifically, decision step 48 compares the current pixel's activity level Md with the low-frequency-region activity level PREV_MD. If Md is not at least equal to that low-frequency-region activity level, then the value of the variation within the current pixel's window will not be used to adjust the activity threshold MD_THR. Otherwise, the temporary-value variable IMG_MD from which the activity-level threshold MD_THR is adjusted slightly up or down, as determined by step 60, toward the variation within the current pixel's window, in one of respective steps 62 and 66.

At the end of a scan line, as determined by decision step 68, activity threshold MD_THR is adjusted in step 70 to a value that is essentially half way from its previous value to the current value of IMG_MD at the end of each line. The "bias" represented by the value +1 in the equation in step 70 is used only to overcome an artifact of the limited-precision arithmetic used in the calculation.

The combination of criteria imposed by decision step 46 (FIG. 3A) tends to identify "interesting" pixels, i.e., pixels at character edges. It is only when a pixel value meets these criteria and its associated local mean filtered value Mb additionally falls within the signal range that it ultimately affects the IMG value from which the quantization thresholds are determined. The requirement that the filtered mean value Mb additionally fall within the signal range is imposed by a test represented by step 72. If Mb is in the signal range, it is compared with the value of LCHAR, which is adjusted downward if Mb is less than LCHAR. Otherwise, LCHAR remains the same. That is, LCHAR corresponds to the (filtered) value of the lowest-valued "interesting" pixel encountered so far in the current scan line. Steps 74 and 76 represent this updating of LCHAR.

Regardless of whether the filtered mean value Mb associated with the current pixel Pi exceeds the background level, Mb is subjected to the test represented by step 78, in which Mb is compared with HCHAR. If the filtered mean value Mb exceeds HCHAR, then HCHAR is increased to that value, as step 80 indicates. That is, HCHAR corresponds to the highest-valued "interesting" pixel encountered so far in the current scan line. Since HCHAR ratchets upward, it also ends up within the signal range even though the routine reaches steps 78 and 80 regardless of the outcome of test 72.

As described previously, the temporary values (LCHAR, HCHAR, BCK_THR) determined during a scan line are used to update the threshold-level-determining parameters (BCK_LEVEL, IMG, UPPER$_{13}$ THR) at the ends of alternate (every two) scan lines. Accordingly, the routine branches on a determination, represented by step 82, of whether the last pixel in the line being processed has been reached. If not, the routine loops back to perform the previous steps for the next pixel. At the end of a scan line (the result of step 82 is YES), however, the routine proceeds to the part depicted in FIG. 3B.

At the end of the first scan line, the routine branches at a decision represented by step 84 to step 86, in which two intermediate parameters PREV_HCHAR and PREV_LCHAR are set to HCHAR and LCHAR, respectively. Additionally, BCK_LEVEL is set to the lower of a value of 160 and either BCK_THR, as shown in the drawing, or some user-defined constant added to or multiplied by BCK_LEVEL in a more-elaborate embodiment. The routine then proceeds to step 88, in the other two quantization-threshold-determining parameters IMG and UPPER_THR are computed. Specifically, IMG is made equal to the less of the value 190 and the average of PREV_HCHAR and PREV_LCHAR. Similarly, UPPER_THR is set equal to either 222 or BCK_LEVEL+IMG, whichever is lower. With these three values determined, the routine resets a toggle flag in step 90 for purposes that will be explained below and proceeds to step 92, in which all thresholds are set in accordance with the process previously described. These thresholds are then employed for the next two scan lines of pixel values in the output of the adaptive filter 24. At the same time, the values of HCHAR and LCHAR are reset to their initialization values of 128 and 200, respectively.

At the end of every line but the first (the answer to query step 84 is NO), the routine proceeds to step 94, in which the previously mentioned toggle flag is tested. In the illustrated embodiment, the thresholds are updated only after every other line, and the flag indicates whether the current line is an odd line or an even line. If the value of the flag is zero, it is set to a value of one in step 96, and the routine returns to the steps of FIG. 3A in order to process the first pixel in the next line. If the value of the flag is already equal to 'one' however the routine updates the values of BCK_LEVEL, PRE-V_HCHAR, and PREV_LCHAR in the steps shown in FIG. 3B occurring in parallel.

Specifically, steps 98, 100, and 102 effect incrementing or decrementing the quantization-threshold-determining parameter BCK_LEVEL by a value of 'one' in accordance with whether the intermediate parameter BCK_THR is greater or less than the previous BCK_LEVEL value. Steps 104, 106, and 108 effect a similar updating of PREV_HCHAR in accordance with the value of HCHAR, while steps 110, 112, and 114 represent a similar adjustment of PREV_LCHAR in accordance with the value of LCHAR.

The other two quantization-threshold-determining parameters IMG and UPPER_THR are then computed in step 88, the flag is reset in step 90, and the thresholds are recalculated in step 92 as performed previously. The routine then returns to its initial point to begin processing the next scan line.

Briefly reviewing the effects of the routine of FIGS. 3A and 3B, the boundary BCK_LEVEL between the background and signal ranges is varied slowly from line to line in such a manner as to tend toward an average of all of those raw-version pixel values that fall within approximately the lightest 80% of the possible values of the eight-bit input resolution. Since most of a typical text image consists of background, the resultant value of BCK_LEVEL is one that is close to the average background level, particularly with the "bias" provided by eliminating from consideration the darkest 20% of the possible values. The resultant value of BCK_LEVEL is then used as the lowest quantization threshold. Consequently, most of the image that is not part of a character, even though it is represented by a significant range of values in the input, is represented by a single output value. This maximizes contrast and avoids wasting a significant part of the output resolution on background areas, which are not of interest.

Similarly, the PREV_HCHAR and PREV_LCHAR values vary slowly from scan line to scan line, tending toward the average high and low Mb values of those pixels identified by the variation and Ma-Mb criteria as being "interesting." The IMG value, which is the arithmetic mean of these values, is then used to "center" the quantization thresholds, in the manner described above, over the values thus identified as being of most interest. In this way, the gray-level quantization scheme described in the above-identified '107 application adaptively concentrates its available resolution in the areas of most interest.

It should be noted that, in principle, the BCK_THR updating of steps 36, 38, 40, 42, and 44 may also be based on the small-window mean Mb rather than on the large-window mean Ma. In fact, BCK_THR may be based on the values of individual pixels. In addition, although the results tend to be better if a "bias" of the type imposed by step 34 is used, such a bias is not required, and, when it is used, differing values also produce good results. Also, the contrast advantages of the quantization process can be obtained without limiting the span of the quantization thresholds in the signal range as described by assigning values based on the parameters IMG and UPPER_THR. This is the approach set forth above for cases in which the number of output bits per pixel equals the number of input bits per pixel.

Although the above-described adaptive gray-level quantization mechanism of my co-pending '107 application offers a significant advance over the prior art, I have discovered that further improvements can be realized for eliminating the influence of non-information anomalies such as scratches, dust, solid color (e.g. black) border or blocks, etc., of an image in the course of determining the minimum and maximum signal levels LCHAR and HCHAR, respectively, and for more accurately updating an estimated image information level PREV_HCHAR so as to effectively prevent discontinuities or 'jumps' in this level during 'on-the-fly', line-by-line adjustment, and thereby effectively obviating the problem of potential corruption of a local mean window by such anomalies and taking into account to what extent the background is 'noisy'.

SUMMARY OF THE INVENTION

More particularly, in accordance with a first aspect of the present invention, I have discovered that the influence of non-information in local neighborhood activity windows employed for determining the minimum and maximum signal levels LCHAR and HCHAR, respectively, may be eliminated by modifying the manner in which the values of HCHAR and LCHAR are updated during a respective scan line. Specifically, that portion of the routine branch containing decision step 46 in FIG. 3A, which serves to adjust intermediate values HCHAR and LCHAR, is modified such that HCHAR and LCHAR are varied incrementally from their initialized values at the beginning of the scan line, rather than being set equal to respective maximum and minimum mean Mb values. Where the image contains non-information anomalies, such as a scratch, dust, a solid color border region, etc., the presence or intrusion of such an anomaly in the local mean window 30, through which the mean value of Mb is determined, may have the effect of dominating or overwhelming a determination of Mb and thereby the values of HCHAR and LCHAR in steps 80 and 76 of FIG. 3A.

Pursuant to this first aspect of the present invention, steps 80 and 76 of the quantization image processing routine of FIG. 4 are modified so as to incrementally increase the value of HCHAR, and to incrementally decrease the value of LCHAR, respectively, by some small delta, rather than being made equal to Mb which is subject to being influenced (potentially dominated) by the presence of non-information anomalies in the mean window. As a consequence, such anomalies do not undesirably cause HCHAR and LCHAR to be established at values that would be essentially an aberration and not truly representative of the content of the image itself.

In accordance with a second improvement to the quantization mechanism described in the above-referenced '107 application, I have also developed a mechanism for more accurately updating the estimated image information level which, as noted earlier, is updated every other line. More specifically, as described above with reference to the parameter updating routine of FIG. 3B, at the end of every other scan line, the routine automatically updates the value of PREV_HCHAR in steps 104-106-108 shown in FIG. 3B. Based upon whether the respective highest raw-version pixel value HCHAR in the current scan line exceeds its associated estimated image information level PREV_HCHAR, the value of PREV_HCHAR is automatically increased or decreased by a value of 'one'.

I have discovered that this automatic updating of the HCHAR value reduces the quality of the resultant image where the image contains a substantial gap or background space beneath a line of text so that there is signal discontinuity in the image being scanned. In such a circumstance automatically updating the estimated image information level PREV_HCHAR associated with the highest pixel value HCHAR results in a threshold adjustment that does not conform to the contents of the image and causes a jump or discontinuity in the output image. To remedy this problem, I make the updating of PREV_HCHAR selective rather than automatic, depending upon the value of the boundary BCK_LEVEL between the background and signal ranges and upon the value of HCHAR. This selective updating effectively prevents discontinuities or 'jumps' in the estimated image information level PREV_HCHAR during its 'on-the-fly' every other line adjustment, thereby making the level change dependent upon how 'noisy' the background is.

In accordance with this second aspect of the improved adaptive quantization level mechanism, the quantizer is operative to generate, for each successive line of the input digital image to be processed, a respective lower limit threshold level LOWER_LIMIT as the sum of the current (not yet updated) value of the estimated information level PREV_HCHAR and the background level BCK_LEVEL/2. In order for the value of PREV_HCHAR to be reduced, it is necessary that HCHAR exceed LOWER_LIMIT and be no greater than the current value of PREV_HCHAR. If neither of these criteria is satisfied, the current value of the estimated information level PREV_HCHAR is not reduced. If this first set of criteria is not satisfied then PREV_HCHAR is not updated.

On the other hand, if HCHAR exceeds LOWER_LIMIT and is no greater than the current value of PREV_HCHAR, then PREV_HCHAR is updated by decreasing its value (established two lines back) by a value of 'one'. Similarly, if HCHAR exceeds the current value of the estimated information level PREV_HCHAR, then HCHAR is updated by increasing its value (again established two lines back) by a value of 'one'.

BRIEF DESCRIPTION OF THE DRAWINGS

FIG. 1 is a block diagram of a digital imaging processing system including an adaptive quantizer for quantizing filtered pixel signals representative of a digital image;

FIG. 2 depicts large and local average pixel value windows;

DETAILED DESCRIPTION

As set forth briefly above, in accordance with a first aspect of the present invention, the potential dominating influence of non-information anomalies in determining the minimum and maximum signal levels LCHAR and HCHAR, respectively, is effectively eliminated by modifying the manner in which the values of HCHAR and LCHAR are updated during a respective scan line.

Figure 3A:
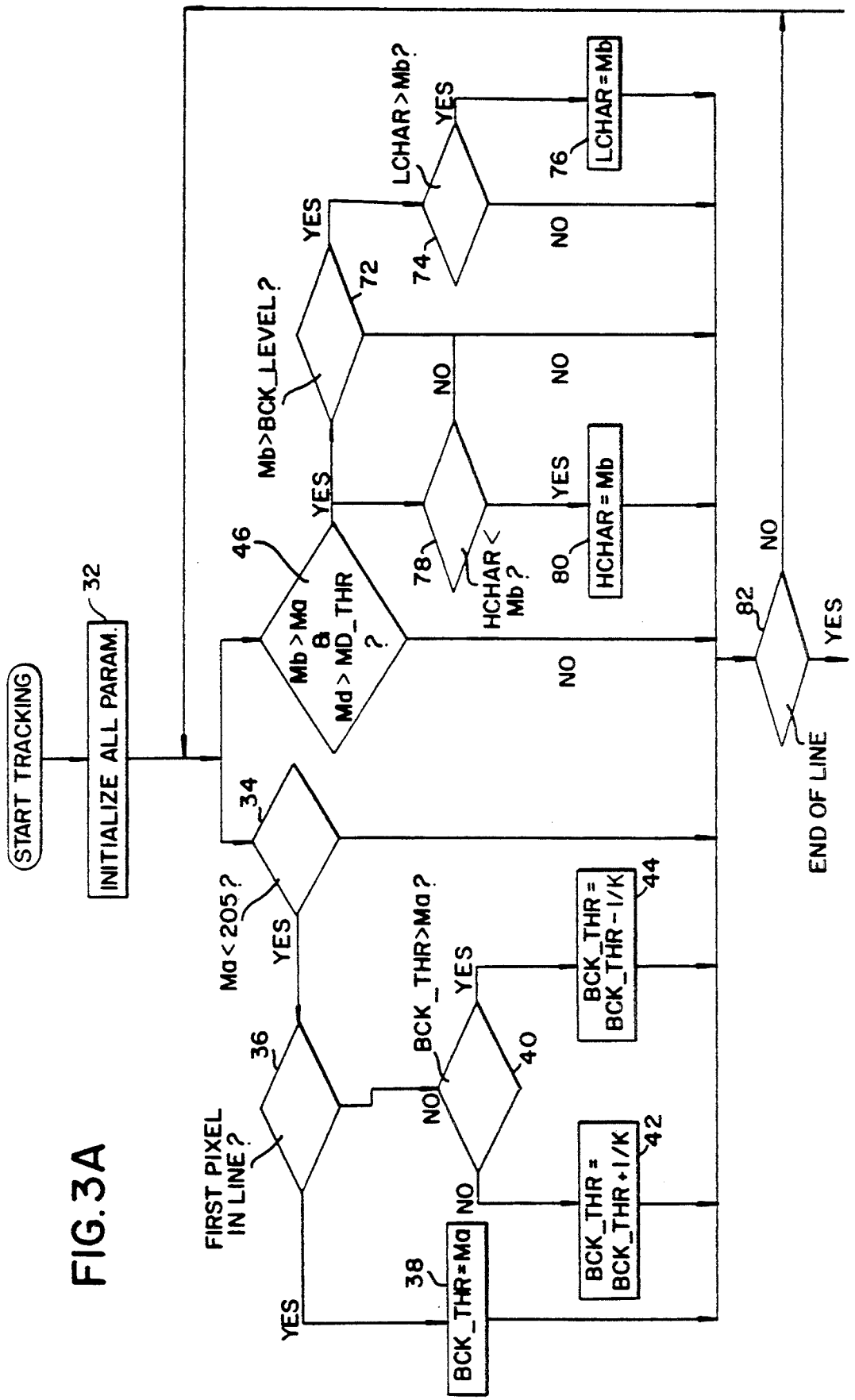
FIGS. 3A and 3B together form a flow chart depicting the manner in which the adaptive quantizer employed in an embodiment of the invention described in my above-referenced '107 application determines certain parameters upon which quantization-level determination is based.
Figure 5:
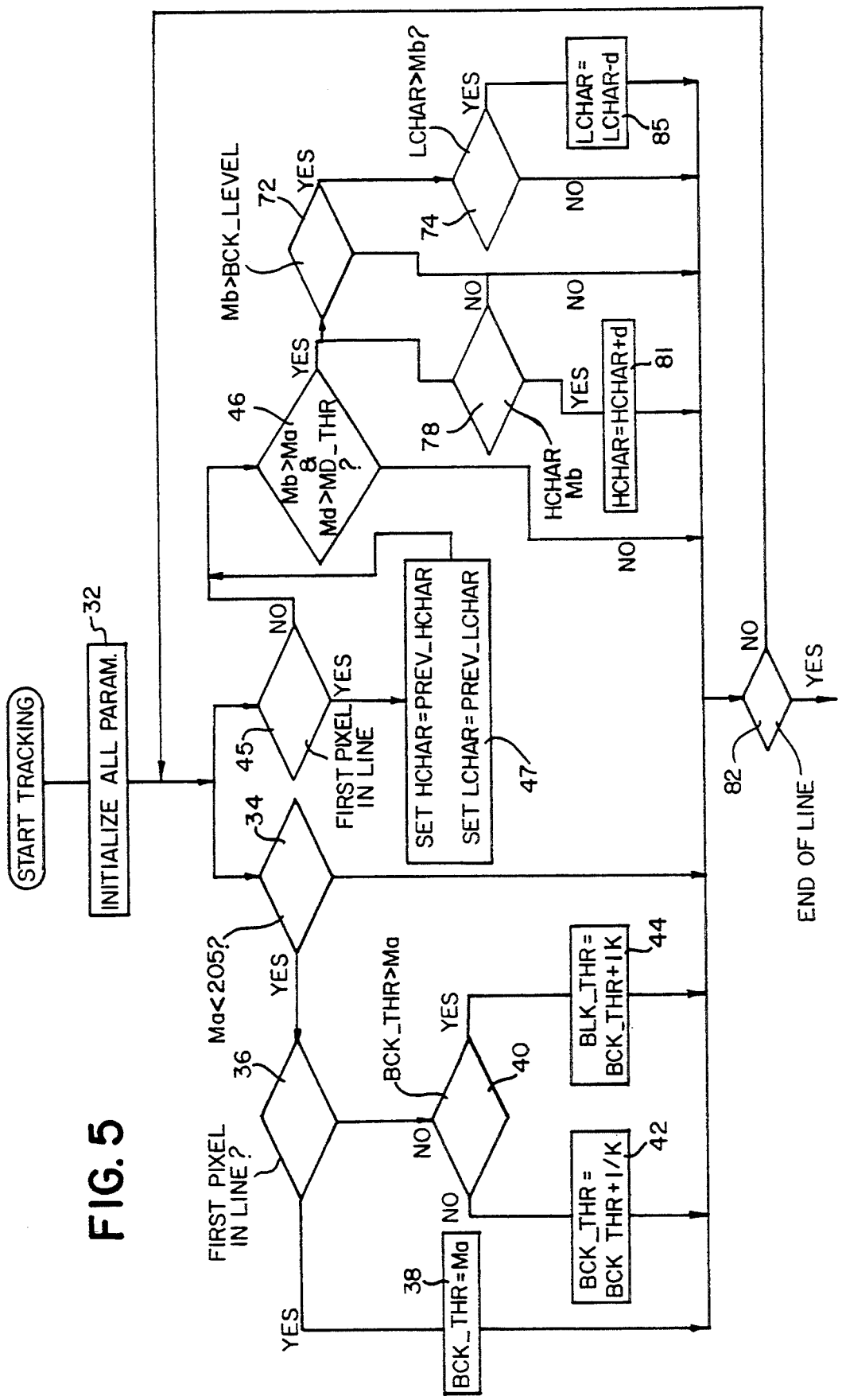
FIG. 5 is a modified flow chart of the routine of FIG. 3A for adjusting the values HCHAR and LCHAR in accordance with a first aspect of the present invention.

FIG. 5 shows a modification of the minimum and maximum signal level updating routine in the right hand portion of FIG. 3A, described above, which is operative to adjust intermediate values HCHAR and LCHAR, such that HCHAR and LCHAR are varied incrementally from their initialized values at the beginning of the scan line, rather than being set equal to respective maximum and minimum mean Mb values. More particularly, a query step 45 determines whether the pixel of interest is the first pixel in the current image line (y) being scanned. If the answer to step 45 is YES, HCHAR and LCHAR for the current line (y) are respectively set equal to PREV_LCHAR$_{y-2}$ and PREV_HCHAR$_{y-2}$ for the previous update (as determined two lines back). If the answer to step 45 is NO, the routine proceeds to steps 46, 72, 78 and 74 as described above with reference to FIG. 3A.

For updating the value of HCHAR, if the filtered mean value Mb exceeds HCHAR (the output of decision step 78 is YES), then, as shown in step 81, HCHAR is increased by a prescribed small delta value 'd' that is empirically selected, rather than directly setting HCHAR equal to the highest-valued "interesting" pixel encountered so far in the current scan line, as in the routine of FIG. 3A describe above. HCHAR still ratchets upward, but does so gradually in an incremental manner. If the answer to decision step 78 is NO, HCHAR is not updated.

To update the value of LCHAR, if the filtered mean value Mb is less than LCHAR (the output of decision step 74 is YES), then, in step 85, LCHAR is decreased by the prescribed small delta value 'd' rather than directly setting LCHAR equal to the lowest-valued "interesting" pixel encountered so far in the current scan line, as in the routine of FIG. 3A describe above. HCHAR still ratchets downward but does so gradually in an incremental manner. Otherwise the value of LCHAR is not updated.

As noted earlier, the effect of the incremental adjustment of HCHAR and LCHAR in steps 81 and 85, respectively, prevents non-information anomalies from dominating the determination of Mb, so as not to undesirably cause HCHAR and LCHAR to be established at values that would be essentially an aberration and not truly representative of the content of the image itself.

Figure 3B:
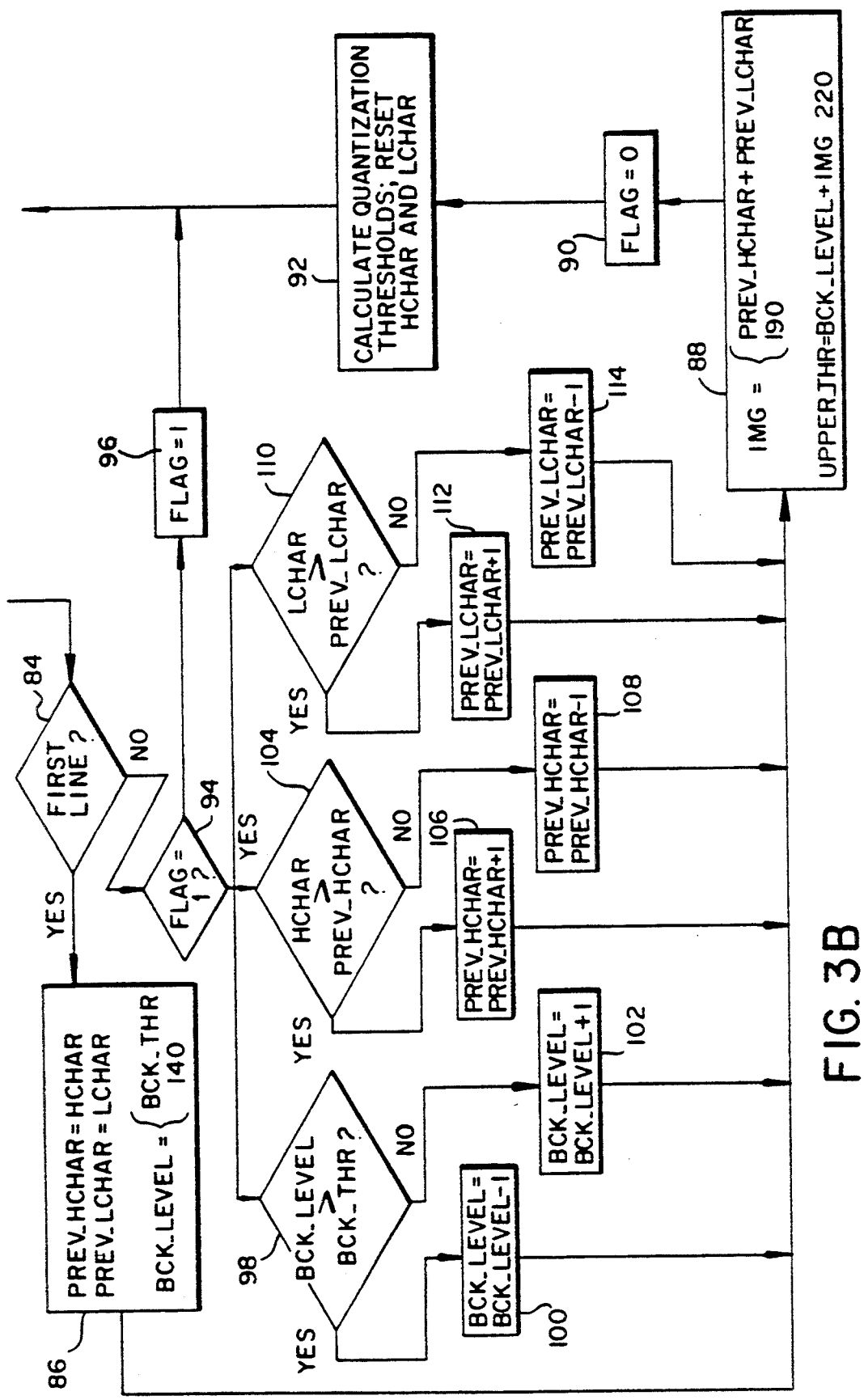
Figure 4:
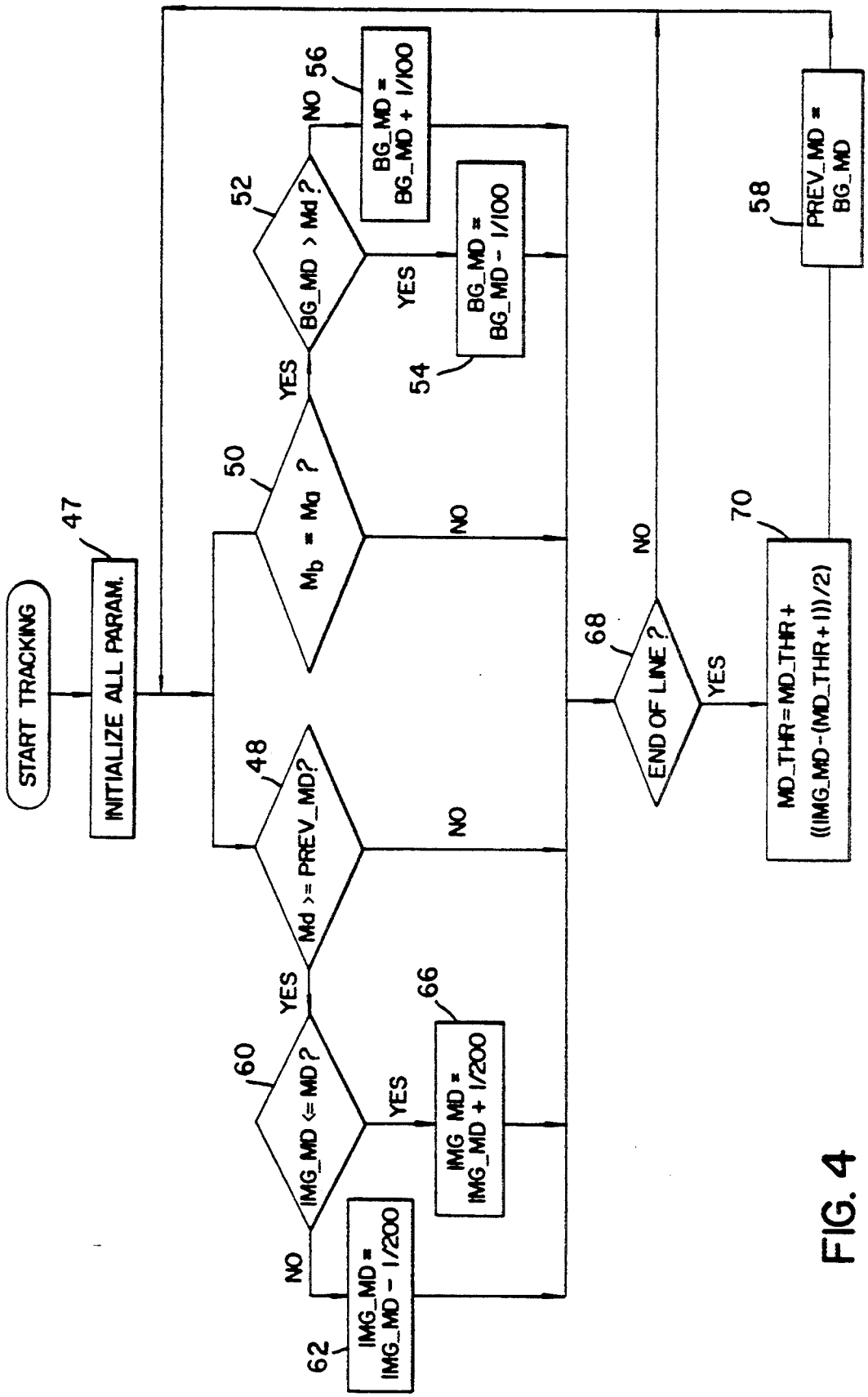
FIG. 4 is a flow chart depicting the manner in which background variation level is determined in an embodiment of the invention described in my above-referenced '107 application.
Figure 6:
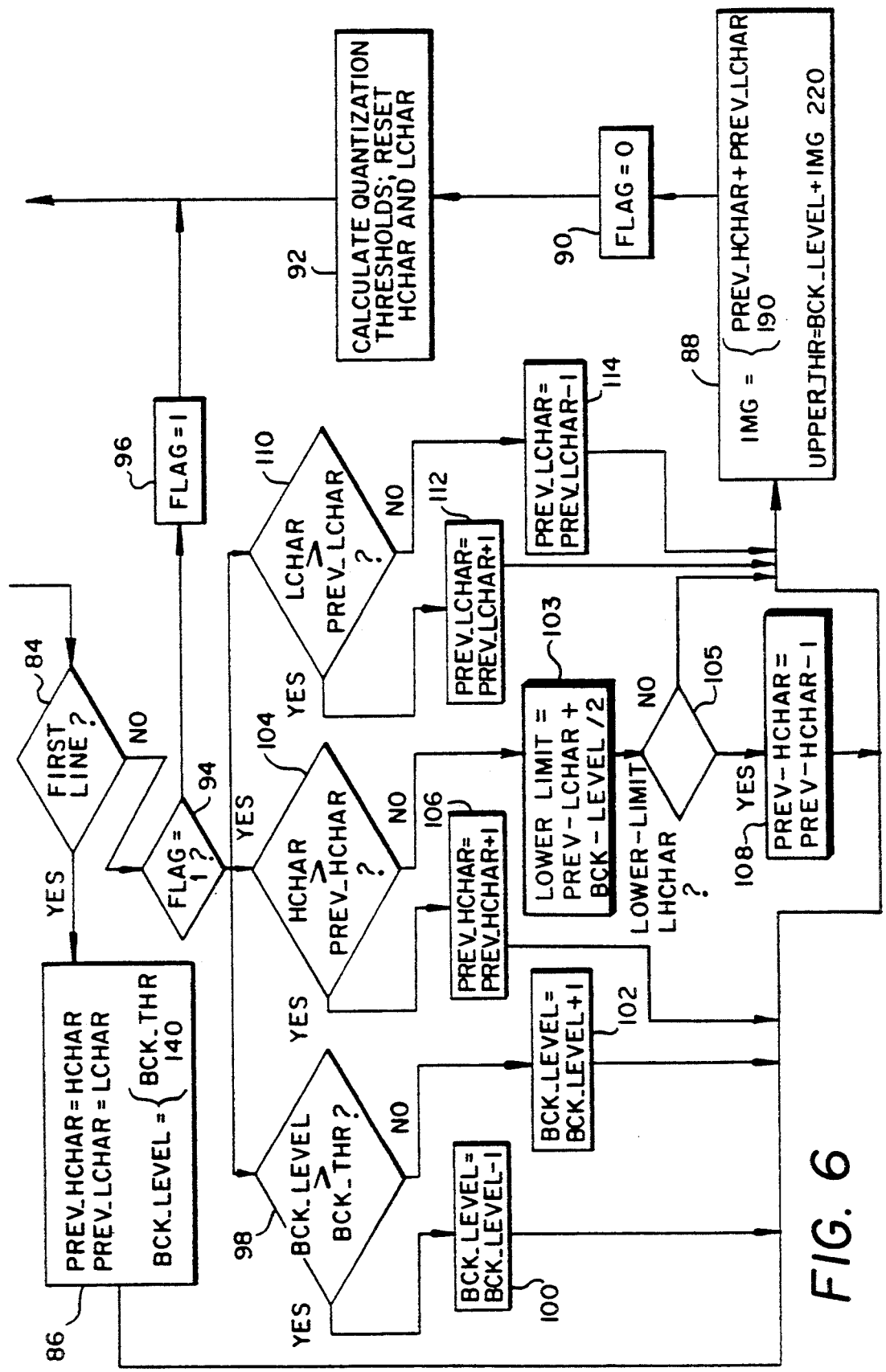
FIG. 6 is a modified flow chart of the routine of FIG. 3B for selectively updating the estimated image information level PREV_HCHAR in accordance with a second aspect of the present invention.

FIG. 6 shows a modification the routine of FIG. 3B for 'selectively', rather than automatically, updating the estimated image information level PREV HCHAR every other line (namely at the end of lines . . . y−2, y, y+2, ... ). More specifically, as described above, at the end of every other scan line, the automatic updating routine of FIG. 3B updates the value of PREV_HCHAR in steps 104-106-108. In the updating routine of FIG. 3B, the value of PREV HCHAR is automatically increased or decreased by a value of 'one' in dependence upon whether the highest raw-version pixel value HCHAR in the current scan line exceeds its associated estimated image information level PREV_HCHAR.

This automatic updating of the PREV HCHAR value can reduce the quality of the resultant image where the image contains a substantial gap or background space (which may contain noise) beneath a line of text (signal), so that there may be a substantial signal/noise discontinuity in the image being scanned. In such a circumstance automatically updating the estimated image information level PREV_HCHAR associated with the highest pixel value HCHAR results in a threshold adjustment that does not conform to the contents of the image.

To remedy this problem the sub-routine of steps 104-106-108 of FIG. 3B is modified in FIG. 6, so as to make the updating of PREV_HCHAR 'selective' rather than automatic, depending upon the value of the boundary BCK_LEVEL between the background and signal ranges and upon the value of HCHAR. This selective updating effectively prevents discontinuities or 'jumps' in the estimated image information level PREV_HCHAR during its 'on-the-fly' every other line adjustment, thereby making the level change dependent upon how 'noisy' the background is.

More particularly, in the modified updating routine of FIG. 6, for each successive line (y) of the input digital image to be processed, if the answer to step 104 is YES, namely, if $HCHAR_y$ exceeds the current value of the estimated information level $PREV\_HCHAR_{y-2}$, then the value of PREV_HCHAR is increased in step 106 from its value (established two lines back or (y−2)) by a value of 'one' just as in the sub-routine of FIG. 3B. On the other hand, if the answer to step 104 is NO, rather than decrement the value of PREV_HCHAR (step 108 in FIG. 3B), the process proceeds to step 103, wherein a lower limit threshold level $LOWER\_LIMIT_y$, which corresponds to the lower limit for the average high image information value, is preliminarily calculated in step 103 as the sum of the current (not yet updated) value of the estimated information level $PREV\_HCHAR_{y-2}$ and the background level $BCK\_LEVEL_{y-2}/2$.

In order for the value of $PREV\_HCHAR_y$ to be reduced from the current value $PREV\_HCHAR_{y-2}$, it is necessary that $HCHAR_y$ exceed $LOWER\_LIMIT_y$ and be no greater than $PREV\_HCHAR_{y-2}$. For this purpose the output of step 103 proceeds to decision step 105 which determines whether $HCHAR_y$ exceeds the $LOWER\_LIMIT_y$ set in step 103. If the answer to step 105 is NO, the current value of PREV_HCHAR remains unchanged. If the answer to step 105 is YES, the routine proceeds to step 108 wherein PREV_HCHAR is updated by decreasing its value (established two lines back) by a value of 'one'.

As will be appreciated from the foregoing description, the present invention improves upon the adaptive gray-level quantization mechanism of my co-pending '107 application by eliminating the influence non-information anomalies in the course of determining the minimum and maximum signal levels LCHAR and HCHAR, respectively, and more accurately updates respective estimated image information level PREV_HCHAR that effectively prevents discontinuities or 'jumps' during 'on-the-fly' line-by-line adjustment thereby effectively obviating the problem of potential corruption of a local mean window and taking into account how 'noisy' the image background is.

What is claimed:

1. A method of processing an input digital image containing an array of input pixels having associated digital input signals, so as to produce digital output signals representative of the values of output pixels of an enhanced output digital image, said method comprising the steps of:
 (a) providing an adaptive quantizing mechanism which is operative to quantize a respective pixel value of an input digital signal associated with a respective input pixel of an input digital image in accordance with a set of quantization levels located outside a range of pixel values representative of image background, said set of quantization levels being adjusted in accordance with approximated average high and low signal levels of successive portions of said input digital image;
 (b) applying digital input signals associated with respective pixels of said input image array to the adaptive quantizing mechanism provided in step (a), so as to produce quantized digital output signals associated with respective output pixels of said output digital image; and wherein
said adaptive quantizing mechanism is operative to selectively modify said approximated average high signal level of a respective portion of said input digital image, in accordance with a prescribed relationship between the approximated average high signal levels of another portion of said input digital image, associated digital input signals of which have been previously quantized by said adaptive quantizing mechanism in step (b), and the maximum signal level of said respective portion of said input digital image wherein said adaptive quantizing mechanism is operative to increase the value of said approximated average high signal level of said respective portion of said input digital image in response to said maximum signal level being greater than the approximated average signal level of said another portion of said input digital image, but leaving the value of said approximated average high signal level of said respective portion of said input digital image unchanged in response to said maximum signal level being no greater than the approximated average high signal level of said another portion of said input digital image and also being no greater than a prescribed combination of the approximated average high signal level of said another portion of said input digital image and a background level of said digital input image.

2. A method according to claim 1, wherein said adaptive quantizing mechanism is operative to reduce the value of said approximated average high signal level of said respective portion of said input digital image in response to said maximum signal level being no greater than the approximated average high signal level of said another portion of said input digital image, and also being greater than a prescribed combination of the approximated average high signal level of said another portion of said input digital image and a background level of said digital input image.

3. A method according to claim 2, wherein said respective portion of said image corresponds to a respective one of successive lines of said digital input image array.

4. A method of processing an input digital image containing an array of input pixels having associated digital input signals, so as to produce digital output signals representative of the values of output pixels of an enhanced output digital image, said method comprising the steps of:

(a) providing an adaptive quantizing mechanism which is operative to quantize a respective pixel value of an input digital signal associated with a respective input pixel of an input digital image in accordance with a set of quantization levels located outside a range of pixel values representative of image background, said set of quantization levels being adjusted in accordance with approximated average high and low signal levels of successive portions of said input digital image;

(b) applying digital input signals associated with respective pixels of said input image array to the adaptive quantizing mechanism provided in step (a), so as to produce quantized digital output signals associated with respective output pixels of said output digital image; and wherein said adaptive quantizing mechanism is operative to selectively modify said approximated average high signal level of a respective portion of said input digital imaged in accordance with a prescribed relationship between the approximated average high signal levels of another portion of said input digital image, associated digital input signals of which have been previously quantized by said adaptive quantizing mechanism in step (b), and the maximum signal level of said respective portion of said input digital image wherein said adaptive quantizing mechanism is operative to incrementally modify said maximum and minimum signal levels associated with a respective portion of said input digital image by prescribed adjustment values in dependence upon predetermined relationships between current values of said maximum and minimum signal levels and an image content value representative of the contents of an image window containing a respective input pixel wherein said image content value is representative of an average of input pixel values within an image window containing said input pixel, and wherein said adaptive quantizing mechanism is operative to incrementally increase the maximum signal level associated with said respective portion of said input digital image by a prescribed adjustment value in dependence upon said maximum signal level being less than said image content value, and is operative to incrementally decrease the minimum signal level associated with said respective portion of said input digital image by said prescribed adjustment value in dependence upon said minimum signal level being greater than said image content value.

5. A method according to claim 4, wherein said adaptive quantizing mechanism is operative to incrementally decrease the minimum signal level associated with said respective portion of said input digital image by said prescribed adjustment value in dependence upon said minimum signal level being greater than said image content value and in dependence upon said image content value being greater than an average background level of said input digital image.

6. A method according to claim 4, wherein respective portions of said image correspond to successive lines of said digital input image array.

7. An apparatus for processing digital input signals representative of input pixels of an input digital image to produce digital output signals representative of output pixels of an enhanced output digital image comprising:

an input unit to which said digital input signals are coupled; and an adaptive quantizer which is operative to quantize a respective pixel value of an input digital signal associated with a respective input pixel of an input digital image in accordance with a set of quantization levels located outside a range of pixel values representative of image background, said set of quantization levels being adjusted in accordance with approximated average high and low signal levels of successive portions of said input digital image, so as to produce quantized digital output signals associated with respective output pixels of said output digital image, and wherein said adaptive quantizer is operative to selectively modify said approximated average high signal level of a respective portion of said input digital image, in accordance with a prescribed relationship between the approximated average high signal level of another portion of said input digital image, associated digital input signals of which have been previously quantized, and the maximum signal level of said respective portion of said input digital image wherein said adaptive quantizer is operative to increase the value of said approximated average high signal level of said respective portion of said input digital image in response to said maximum signal level being greater than the approximated average high signal level of said another portion of said input digital image, but leaving the value of said approximated average high signal level of said respective portion of said input digital image unchanged in response to said maximum signal level being no greater than the approximated average high signal level of said another portion of said input digital image and also being no greater than a prescribed combination of the approximated average high signal level of said another portion of said input digital image and a background level of said digital input image.

8. An apparatus according to claim 7, wherein said adaptive quantizer is operative to selectively decrement the value of said approximated average high signal level of said respective portion of said input digital image in dependence upon said maximum signal level being no greater than the approximated average high signal level of said another portion of said input digital image.

9. An apparatus according to claim 8, wherein said adaptive quantizer is further operative to selectively decrement the value of said approximated average high signal level of said respective portion of said input digital image in dependence upon said maximum signal level being greater than a prescribed combination of the approximated average high signal level of said another portion of said input digital image and a background level of said digital input image.

10. An apparatus according to claim 7, wherein said adaptive quantizer is operative to reduce the value of said approximated average high signal level of said respective portion of said input digital image in response to said maximum signal level being no greater than the approximated average high signal level of said another portion of said input digital image, and also being greater than a prescribed combination of the approximated average high signal level of said another portion of said input digital image and a background level of said digital input image.

11. An apparatus according to claim 10, wherein said respective portion of said image corresponds to a respective one of successive lines of said digital input image array.

12. An apparatus for processing digital input signals representative of input pixels of an input digital image to produce digital output signals representative of output pixels of an enhanced output digital image comprising:
an input unit to which said digital input signals are coupled; and
an adaptive quantizer which is operative to quantize a respective pixel value of an input digital signal associated with a respective input pixel of an input digital image in accordance with set of quantization levels located outside a range of pixel values representative of image background, said set of quantization levels being adjusted in accordance with approximated average high and low signal levels of successive portions of said input digital image, so as to produce quantized digital output signals associated with respective output pixels of said output digital image, and wherein said adaptive quantizer is operative to selectively modify said approximated average high signal level of a respective portion of said input digital image, in accordance with a prescribed relationship between the approximated average high signal level of another portion of said input digital image, associated digital input signals of which have been previously quantized, and the maximum signal level of said respective portion of said input digital image wherein said adaptive quantizer is operative to incrementally modify said maximum and minimum signal levels associated with a respective portion of said input digital image by prescribed adjustment values in dependence upon predetermined relationships between current values of said maximum and minimum signal levels and an image content value representative of the contents of an image window containing a respective input pixel wherein said image content value is representative of an average of input pixel values within an image window containing said input pixel, and wherein said adaptive quantizer is operative to incrementally increase the maximum signal level associated with said respective portion of said input digital image by a prescribed adjustment value in dependence upon said maximum signal level being less than said image content values and is operative to incrementally decrease the minimum signal level associated with said respective portion of said input digital image by said prescribed adjustment value in dependence upon said minimum signal level being greater than said image content value.

13. An apparatus according to claim 12, wherein said adaptive quantizer is operative to incrementally decrease the minimum signal level associated with said respective portion of said input digital image by said prescribed adjustment value in dependence upon said minimum signal level being greater than said image content value and in dependence upon said image content value being greater than an average background level of said input digital image.

14. An apparatus according to claim 13, wherein respective portions of said image correspond to successive lines of said digital input image array.

* * * * *